United States Patent [19]
Gee

[11] Patent Number: 5,351,540
[45] Date of Patent: Oct. 4, 1994

[54] GRADE ANGLE AND ACCELERATION SENSOR

[75] Inventor: Thomas A. Gee, Allen Park, Mich.

[73] Assignee: Eaton Corporation, Cleveland, Ohio

[21] Appl. No.: 954,665

[22] Filed: Sep. 30, 1992

[51] Int. Cl.$^5$ ............................................. G01P 15/08
[52] U.S. Cl. .................................. 73/509; 73/178 R; 73/517 R; 73/146
[58] Field of Search ..................... 73/146, 105, 178 R, 73/493, 509, 517 R; 33/521

[56] References Cited

U.S. PATENT DOCUMENTS

| | | | |
|---|---|---|---|
| 3,588,188 | 6/1971 | Shattock | 303/21 |
| 3,752,251 | 8/1973 | Gaeke | 73/514 |
| 4,713,764 | 12/1987 | Klatt | 364/424.1 |
| 5,187,977 | 2/1993 | Koschorek et al. | 73/146 |

Primary Examiner—Donald Woodiel
Attorney, Agent, or Firm—Brooks & Kushman

[57] ABSTRACT

A grade and acceleration sensor having a weight, a first sensor for measuring a first parameter of the weight due at least to the force of gravity to generate a first signal, a second sensor for measuring a second parameter of the weight due to both the force of gravity and the acceleration of the vehicle on which the sensor is mounted to generate a second signal, a grade angle generator generating the grade angle $\theta$ in response to the first and second signal, and an acceleration generation generating a signal having a value corresponding to the acceleration of the vehicle in response to the first and second signals. In a first embodiment, the weight is a bob of a pendulum, the first parameter is a displacement angle of the bob due to acceleration and gravity and the second parameter is the force on the arm of the bob due to gravity and acceleration. In a second embodiment, the first parameter is force generated by a weight due to gravity along a first axis and the second parameter is the force generated by the weight due to acceleration and gravity along a second axis normal to the first axis.

25 Claims, 4 Drawing Sheets

GRADE ANGLE AND ACCELERATION SENSOR

TECHNICAL FIELD

The invention is related to the field of grade angle sensors for vehicles which measure the angle of the road grade being traversed and, in particular, to a single sensor which measures the grade angle of the road and the acceleration of the vehicle.

BACKGROUND ART

With the advent of anti-lock brake systems, automatic transmissions, semi-automatic transmissions, electronically enhanced braking systems and electronic fuel control systems, it has always been known that the operation of these systems may be enhanced if information relating to the vehicle's true acceleration is available and whether or not the vehicle is ascending or descending a road grade is known.

Gaehe, in U.S. Pat. No. 3,752,251, discloses a grade sensor for use in conjunction with a wheel braking system. The grade sensor disclosed by Gaehe is designed to be insensitive to acceleration and deceleration of the vehicle. Shattock, in U.S. Pat. No. 3,588,188, discloses a pendulum-type acceleration sensor for detecting the acceleration and deceleration of a vehicle for a braking system, while Klatt teaches how information indicating whether the vehicle is traveling uphill or downhill can be used to control an automatic transmission. Klatt teaches the use of changes in the engine's torque to make this determination.

Disclosed herein is a grade angle and acceleration sensor which can provide to anti-lock braking systems, automatic transmissions and electronically controlled braking systems both the grade angle of the road being traversed and the true acceleration or deceleration of the vehicle along the roadway.

SUMMARY OF THE INVENTION

The invention is a grade angle and acceleration sensor for providing the grade angle of the road being traversed by a vehicle and a true value of the vehicle's acceleration or deceleration. The sensor has a weight having a predetermined mass m, a first sensor generating a first signal indicative of a first parameter caused by the weight in response to at least the force of gravity, a second sensor generating a signal indicative of a second parameter caused by the weight in response to the combined forces of gravity and acceleration of the vehicle acting on the weight, grade angle logic means responsive to the first and second signals for generating a grade angle signal $\theta$ having a value corresponding to the angle of the road grade being traversed by the vehicle and acceleration logic means responsive to the first and second signals for generating an acceleration signal corresponding to the acceleration of the vehicle.

In a first embodiment, the sensor is a pendulum in which the first signal is the angle at which the bob of the pendulum is displaced due to the forces and gravity and the second signal is the force exerted by the bob due to gravity and acceleration of the vehicle. The grade angle $\theta$ is computed from the equation:

$$\theta = 90° - \arcsin(F\sin\alpha/mg)$$

where $\alpha$ is the angle of displacement of the pendulum's bob from a predetermined axis of the sensor and F is the force exerted by the bob due to gravity and acceleration. The acceleration is compiled from the equation:

$$a = [g\sin(180° - \beta - \alpha)]/\sin\alpha$$

where the angle $\beta$ is equal to the arc sin $(F\sin\alpha)/mg$.

In an alternate embodiment, the sensor comprises a weight, a first force sensor measuring the force exerted by the weight in a direction normal to the longitudinal axis of the vehicle and a second force sensor measuring the force exerted by the weight in a direction parallel to the longitudinal axis of the vehicle. The grade angle logic means computes the grade angle $\theta$ by solving the equation:

$$\theta = \arccos(F_1/F_0)$$

where $F_1$ is the force measured by the first force sensor when the vehicle is on a grade and $F_0$ is the force measured by the first force sensor when the longitudinal axis of the vehicle is horizontal. The acceleration logic means computes the acceleration by solving the equation:

$$a = F_2/m$$

where $F_2$ is equal to the force F measured by the second force sensor minus the force $F_3$ which is the force exerted by the weight on the second sensor due to gravity when the longitudinal axis of the vehicle is not horizontal $$F_3 = mg\sin\theta$$

where $\theta$ is the grade angle.

One advantage of the grade and acceleration sensor is that a single sensor provides both the angle of the grade being traversed by the vehicle and the vehicle's acceleration.

Another advantage of the grade and acceleration sensor is that the acceleration and deceleration are measured independent of wheel speed and road slip.

Still another advantage of the alternate embodiment is that it requires no moving parts.

These and other advantages of the grade and acceleration sensor will become more apparent from a reading of the specification in conjunction with the attached drawings.

DETAILED DESCRIPTION OF THE INVENTION

Figure 1:
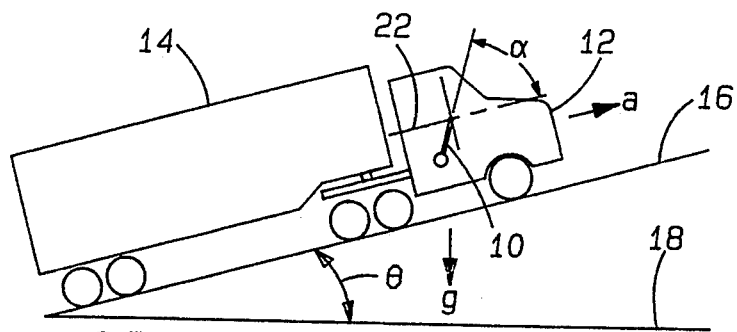
FIG. 1 is a drawing showing a vehicle climbing a road grade and the forces acting on the sensor.

A first embodiment of the grade and acceleration sensor 10 is shown in FIG. 1 as being mounted on a vehicle, such as a tractor 12 pulling a loaded trailer 14 up a grade 16. The grade 16 is at an angle $\theta$ with respect to the horizontal 18. In FIG. 1, the tractor 12 is accelerating up the grade 16 with an acceleration "a".

Figure 2:
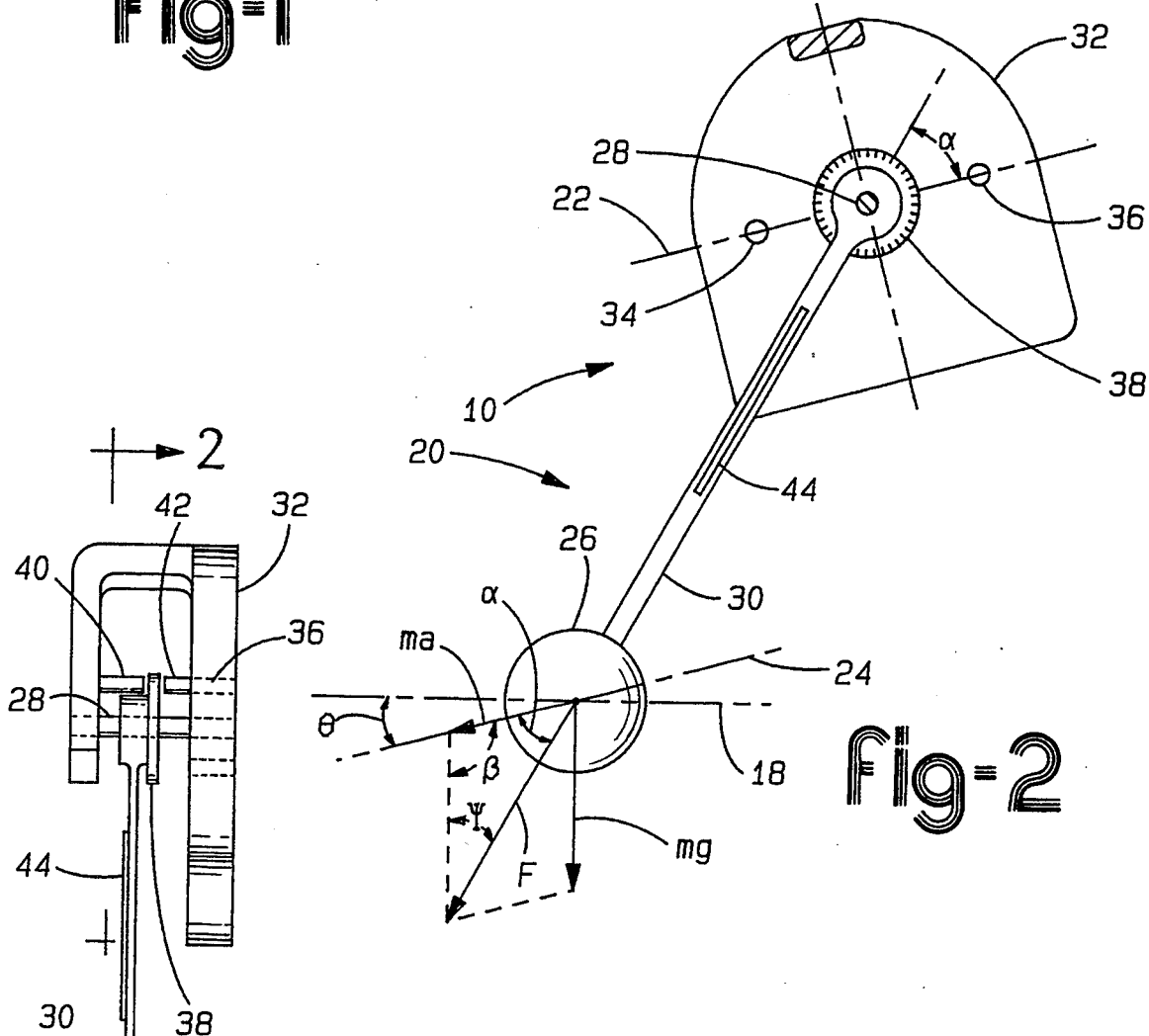
FIG. 2 is a side view of a first embodiment of the grade and acceleration sensor.
Figure 3:
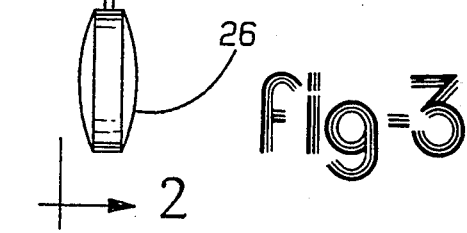
FIG. 3 is a front view of the grade and acceleration sensor shown in FIG. 2.

A first embodiment grade and acceleration sensor 10 is in the form of a pendulum 20 as shown in FIGS. 2 and 3. The pendulum 20 is displaced at an angle $\alpha$ from the longitudinal axis 22 of the tractor due to forces exerted on the pendulum 20 by gravity "g" and the acceleration "a" of the vehicle. The longitudinal axis 22 of the vehicle is defined as being substantially parallel to the road surface on which the vehicle is traversing.

As shown in FIGS. 2 and 3, the grade and acceleration sensor 10 has a weighted bob 26 pivotally connected to a pivot shaft 28 by a rigid arm 30. The pivot shaft 28 is mounted to a mounting bracket 32 which is fixedly mountable to the vehicle by a pair of threaded fasteners (not shown) through mounting apertures 34 and 36.

A rotary optical encoder 38 is attached to the arm 30 concentric with the axis of the pivot shaft 28 and is rotatable about the pivot shaft 28 with the angular displacement of the pendulum 20. A light source 40 such as a light emitting diode is disposed on one side of rotary optical encoder 38 and a photodetector 42 is disposed on the opposite side of the rotary optical encoder 38. The rotary optical encoder 38 may be of any type known in the art used to measure an angle of rotation. A strain gage 44 is attached to the arm 30 and generates an output signal having a value corresponding to the total force "F" acting on the bob 26 of the pendulum 20.

As indicated in FIG. 2, two independent forces are acting on the bob 24 which causes it to be displaced at the angle $\alpha$ from the longitudinal axis 22 of the vehicle. The first force is the force mg where "m" is the weight of the bob 26 and "g" is the acceleration due to gravity. The force mg is the force due to gravity and is perpendicular to the horizontal 18 and is 90°$-\theta$ relative to the line 24 parallel to the longitudinal axis of the vehicle. The second force acting on the bob 26 is the force "m" where "m" again is the mass of the bob 26 and "a" as previously described is the acceleration of the vehicle. Movement of the grade sensor 10 perpendicular to the road will cause cyclic accelerations in the direction perpendicular to the road. However, they are cyclic and have an average value of zero over relatively short time periods.

The two forces, as shown by the force diagram illustrated, combine to produce a resultant force F acting on the bob 26 of the pendulum 20 which is measured by the strain gage 44.

By the law of sines:

$$\frac{mg}{\sin\alpha} = \frac{F}{\sin\beta}$$

where $\beta$ is the angle 90°$-\theta$ and $\theta$ is the angle of the grade as shown in FIG. 1. Therefore:

$$\beta = 90° - \theta = \arcsin\left(\frac{F\sin\alpha}{mg}\right)$$

and $$\theta = 90° - \arcsin\left(\frac{F\sin\alpha}{mg}\right) \quad (1)$$

Since F and $\alpha$ are the measured values, the grade angle $\theta$ can be readily computed from Equation 1 using the measured values of the force F and the angle $\alpha$. Equation 1 has two solutions $\alpha$, and 180°$-\alpha$, indicating the grade is an uphill grade or a downhill grade. An uphill grade can generally be distinguished from a downhill grade by the sign of $\alpha$. Additionally, memorized values of the immediately preceding grade values can provide a grade angle history usable in making a decision which of the two solutions is correct.

In a like manner, the acceleration can be determined in several ways. Again, from the law of sines:

$$\frac{ma}{\sin\psi} = \frac{mg}{\sin\alpha}$$

where the angle $\Psi$ is equal to (180°$-\beta-\alpha$)

$$\sin\psi = \frac{a\sin\alpha}{g}$$

then $$a = \frac{g\sin(180° - \beta - \alpha)}{\sin\alpha} \quad (2)$$

where the angle $\beta$ is the angle between the horizontal axis of the pendulum and a vertical parallel to the force of gravity. $\beta$ is equal to arc sin (F sin$\alpha$/mg).

The acceleration a has two solutions. The proper solution may be derived from the prior history of the angle $\alpha$ and the force F. Alternatively, other clues of the vehicle acceleration or deceleration may exist to allow a choice between the two solutions. For example, the acceleration may be measured directly from the change in the rotational velocity $$\left(\frac{dw}{dt}\right)$$

of the vehicle's drive shaft as a function of time or any other rotational member of the vehicle, such as the speedometer cable driving the vehicle's speedometer.

Figure 4:
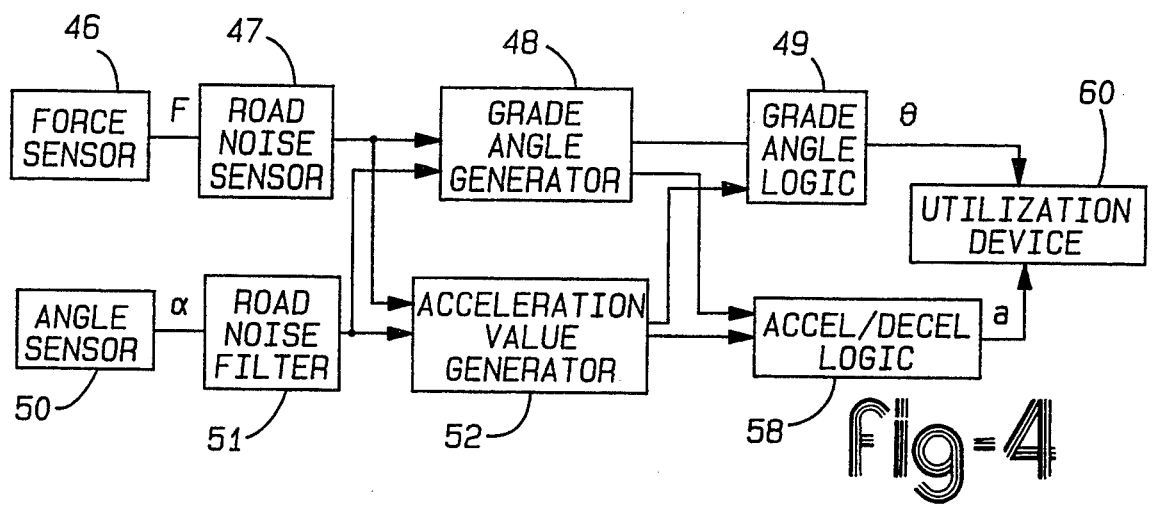
FIG. 4 is a block circuit diagram showing the electrical components of the first embodiment.

FIG. 4 is a block diagram of the circuit for generating the grade signal $\theta$ from the value of the angle $\alpha$ of the pendulum and the force F. In FIG. 4, the force sensor 46 may be the strain gage 44 shown in FIGS. 2 and 3 and the angle sensor 50 may consist of optical angle encoder 38, light-emitting diode 40 and photodetector 42. It is recognized that other force sensors and angle sensors known in the art may be used in place of those described above.

Since the pendulum will be mounted on a moving vehicle, it will be subject to road noise and ordinary vehicular vibration. In order to remove these road noises and vehicular vibrations, the output signal (F) generated by the force sensor 46 will be filtered by a first road noise filter 47 and the output signal ($\alpha$) generated by the angle sensor 50 will be filtered by a comparable road noise filter 51. The first and second road noise filters 47 and 51 may be low pass filters or they may be averaging circuits as is known in the art.

A grade angle generator 48 will compute the grade angle $\theta$ using Equation (1) and the grade angle logic 49 will determine its correct solution from the value of the acceleration determined by the solution of Equation (1) and the prior history of the values of F and $\alpha$. The grade angle $\theta$ may then be used by a utilization device 60 such as an anti-lock brake system or an automatic or semi-automatic transmission.

An acceleration value generator 52 will generate an acceleration value "a" using Equation (2) and the accel/decel logic 58 will determine the correct solution of Equation (2) from the prior history of the values of the grade angle $\theta$ and the value of the acceleration a. The value of the acceleration a is also received by the utilization device 60.

Figure 5:
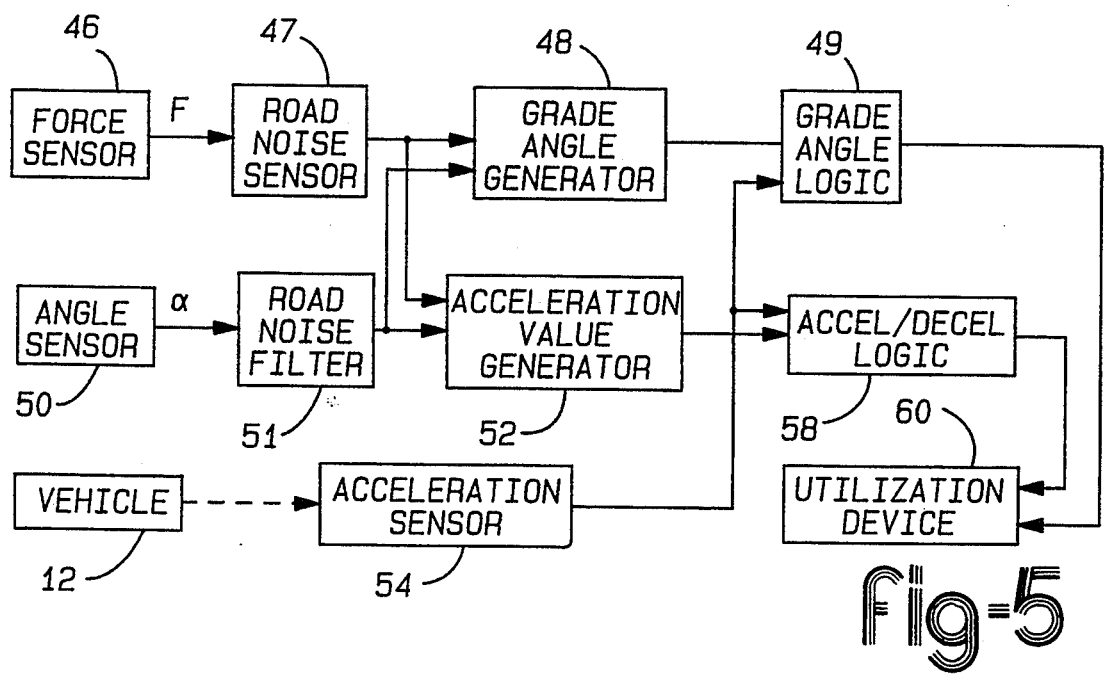
FIG. 5 is an alternate block circuit diagram of the electrical components of the first embodiment.

FIG. 5 shows an alternate grade angle sensor system which includes an acceleration direction sensor 54 which generates a first acceleration signal in response to the change in the rotational velocity of vehicle engine or drivetrain. The force sensor 46, the angle sensor 50, the first and second road noise filters 47 and 51, the grade angle signal generator 48, and the acceleration value generator 52 are essentially the same as shown in FIG. 4. The grade angle logic 56 and the accel/decel logic 58 select the correct values of the grade angle $\theta$ and the value of the acceleration "a" in response to the signal received from the acceleration sensor 54

Figure 6:
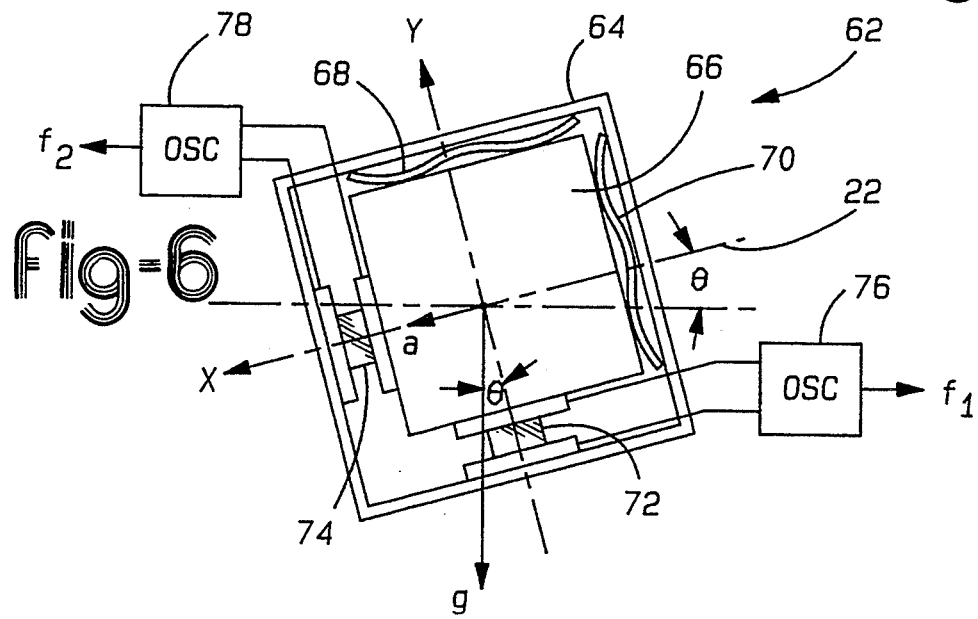
FIG. 6 is a side view of an alternate embodiment of the grade and acceleration sensor.

An alternate embodiment of the grade sensor 62 is shown in FIG. 6. The grade sensor 62 has a box-like housing structure 64 mountable to the frame of the vehicle 12. The grade sensor 62 has a weight 66 having a mass m mounted within the box-like structure 64. The weight 66 may be square as shown, but alternately may be circular, octagonal, or any other shape desired. The weight is biased by two orthogonally disposed leaf springs 68 and 70 against two orthogonally disposed piezoelectric crystals 72 and 74. As shown, leaf springs and piezoelectric crystals are oriented such that leaf spring 70 and piezoelectric crystal 74 define the x axis of the grade sensor 62 and leaf spring 68 and piezoelectric crystal 72 define the y axis. Preferably, the grade sensor is mounted on the vehicle with the x axis parallel to the vehicle's longitudinal axis 22 and the "y" axis normal to the vehicle's longitudinal axis.

Piezoelectric crystal 72 is connected to an oscillator circuit 76 which generates an output signal having a frequency f, which is variable as the function of the force applied to the piezoelectric crystal 72 by the weight 66 and leaf spring 68. In a like manner, piezoelectric crystal 74 is connected to an oscillator circuit which generates an output signal having a frequency $f_2$ which is variable as a function of the force applied to piezoelectric crystal 74 by the weight 66 and leaf spring 70. As is known in the art, the frequencies $f_1$ and $f_2$ correspond to the individual orthogonal forces acting on the piezoelectric crystals 72 and 74. The frequency $f_1$ of the output signal of the oscillator circuit 76 will vary as the sensor is rotated relative to the force of gravity $F_g$ due to the vehicle ascending or descending a grade $\theta$. The piezoelectric crystal 72 is substantially insensitive to acceleration of the vehicle along the vehicle's longitudinal axis 22. Therefore, the frequency of oscillator 76 will not change as a function of vehicle acceleration or deceleration. In contrast, piezoelectric crystal 74 is sensitive to both acceleration and deceleration of the vehicle along its longitudinal axis and an angular rotation due to the vehicle ascending or descending a road grade disposed at an angle $\theta$ relative to the horizontal.

The angle $\theta$ may be derived from the equation:

$$\theta = \text{arc cos } (F_1/F_o) \qquad (3)$$

where $F_o$ is the force on piezoelectric crystal 72 exerted by the weight 66 when the x axis of the sensor is horizontal and $F_1$ is the force on the piezoelectric crystal 72 exerted by the weight 66 when the x axis of the sensor is at an angle $\theta$ to the horizontal.

The acceleration of the vehicle may be derived from the force $F_2$ exerted on piezoelectric crystal 74 due to acceleration of the vehicle and the force $F_3$ due to the force exerted by the weight 66 by gravity, where:

$$F_2 = ma \text{ and}$$

$$F_3 = mg \sin \theta$$

The total forces acting on piezoelectric crystal 74 are $$F'' = F_2 \pm F_3$$

therefore $$F_2 = (F'' \mp F_3) = ma$$

and $$a = (F'' \mp F_3)/m \qquad (4)$$

Since frequency $f_1$ is proportional to the total force $F^1$ acting on piezoelectric crystal 72, $f_1$ is proportional to the force $F_1$ exerted by the weight 66 due $$F_1 = F - F_{S1} = f_1 k - F_{S1}$$

where k is a constant converting $f_1$ to the force $F'$.

In a similar manner, the frequency $f_2$ is proportional to the total force $F''$ acting on piezoelectric crystal 74, $f_2$ is proportional to the force $F_2$ exerted by weight 66 due to acceleration, the force $F_3$ is the force exerted by the weight 66 due to gravity when the sensor is rotated relative to the horizontal, and the force $F_{S2}$ is the force exerted by leaf spring 70. The value of the forces $F_1$ and $F_3$ can be derived from the equation:

$$F_2 \pm F_3 = F'' - F_{S2} - f_2 k - F_{S2}$$

Again, it is recognized that the calculation for the values of the grade angle $\theta$ and the acceleration a will have two values and, as discussed relative to the grade sensor illustrated in FIGS. 1-3. The appropriate value may be selected from a past history of the value the grade angle $\theta$ and the acceleration a.

Figure 7:
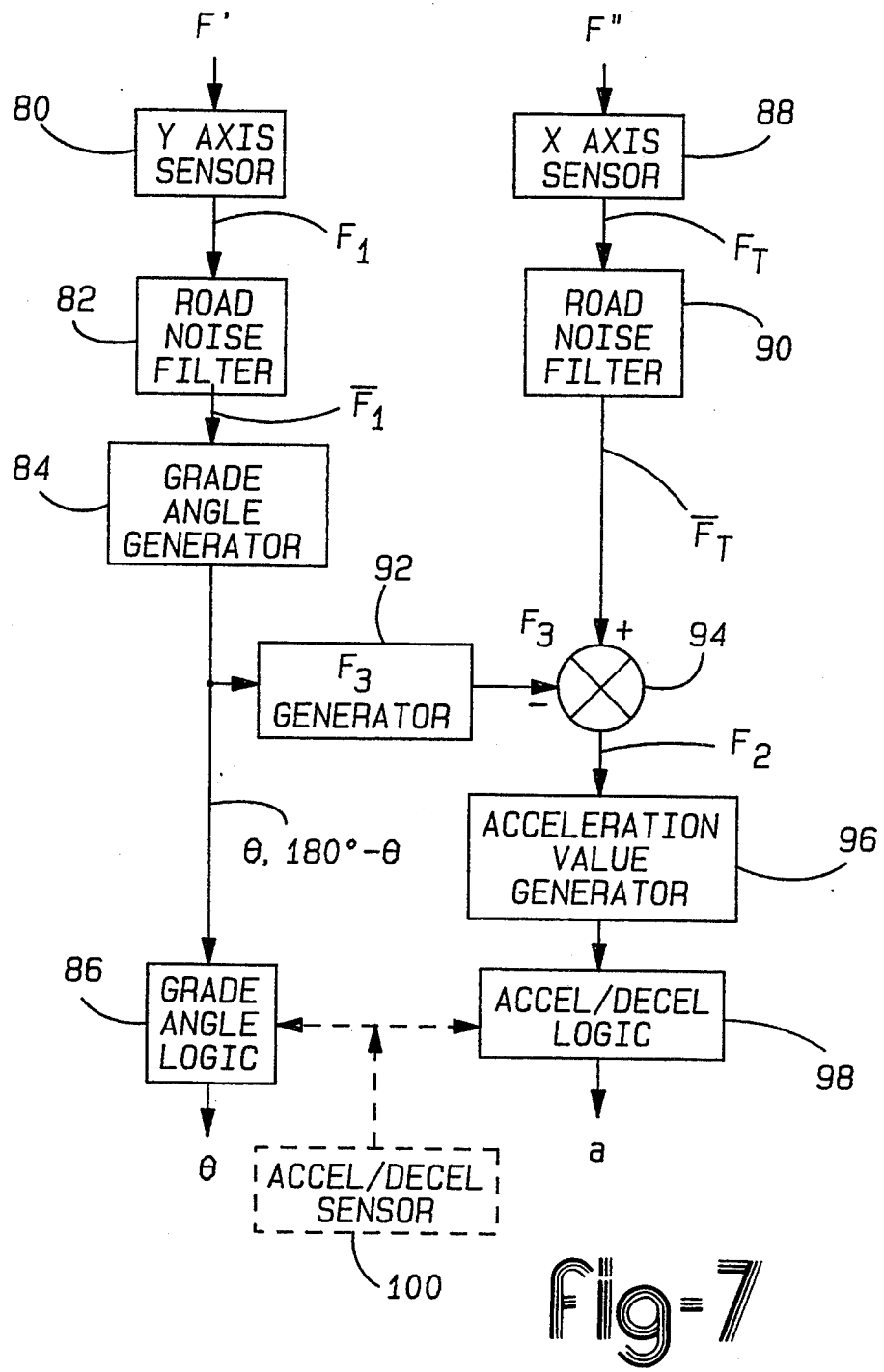
FIG. 7 is a block diagram showing the associated electrical circuit components.
Figure 8:
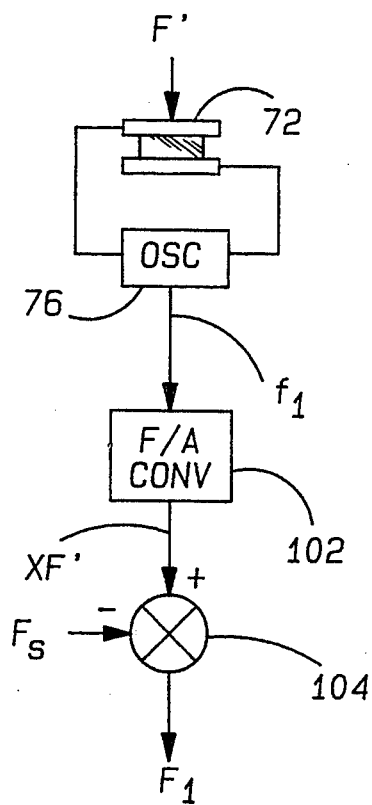
FIG. 8 is a block circuit diagram showing the details of the X and Y axis sensors.

FIG. 7 is a block diagram of the electronic circuit for generating the grade angle $\theta$ and the acceleration "a". A y-axis sensor 80 generates a signal having the value $F_1$ in response to the force $F'$. The y-axis sensor 80, as shown in FIG. 8, comprises the piezoelectric crystal 72, the oscillator circuit 76, a frequency to analog (F/A) converter 102 which converts the frequency $f_1$ to an analog signal having a value proportional to the total force $F'$ acting on piezoelectric crystal 72. Sum amplifier 104 subtracts from the analog signal a reference signal $F_{S1}$ corresponding to the portion of the total force $F'$ produced by the leaf spring 68. The output of the sum amplifier 104 is the signal $F_1$ corresponding to the force exerted by the weight 66 only.

The output of the y-axis sensor 80 is filtered by a road noise filter 82 which outputs a filter signal $\overline{F}_1$. A grade angle generator 84 generates a pair of grade angle signals, $\theta$ and $180-\theta$, which is received by a grade angle logic circuit 86 and an $F_3$ generator 92. The grade angle logic circuit 86 selects the proper grade angle based on the prior history of the grade angle $\theta$ and the acceleration "a".

An x-axis sensor 88 generates an analog signal $F_T$ corresponding to the sum of forces $F_2$ and $F_3$ acting on piezoelectric crystal 74 by weight 66 due to acceleration and the force of gravity. The structure of the x-axis sensor 88 is substantially the same as structure of the y-axis sensor 80 shown in FIG. 8 and therefore need not be described in detail. The signal $F_T$ is filtered by a road noise filter 90 to remove road noise from the signal $F_T$. The filtered signal $\overline{F}_T$ is received at the + input of a sum amplifier 94 while the signal $F_3$ from the $F_3$ generator 92 is received at a negative input. The $F_3$ generator 92 generates the value of the force $F_3$ using Equation (4) where $F_3 = mg \sin \theta$, m is the mass of weight 66 and g is the acceleration due to gravity. The output of the sum amplifier is the force $F_2$ where $F_2 = F_T - F_3$ exerted on piezoelectric crystal 74 by the weight 66 due to acceleration of the vehicle along the x axis. An acceleration value generator 96 converts the force $F_2$ to an acceleration value which has two possible values, $+a$ for acceleration and $-a$ for deceleration.

An accel/decel logic circuit 98 selects either the acceleration value "$+a$" or the deceleration value "$-a$" based on the prior history of the grade angle $\theta$ and the acceleration value.

The circuit shown in FIG. 7 may include an acceleration/deceleration sensor 100 shown in phantom, responsive to the time derivative of a moving member of the vehicle's drivetrain to generate a signal having a first value signifying an acceleration condition and a second value signifying a deceleration condition. This signal is received by the grade angle logic circuit 86 and the accel/decel logic 98 simplifying the logic for selecting the proper value.

Figure 9:
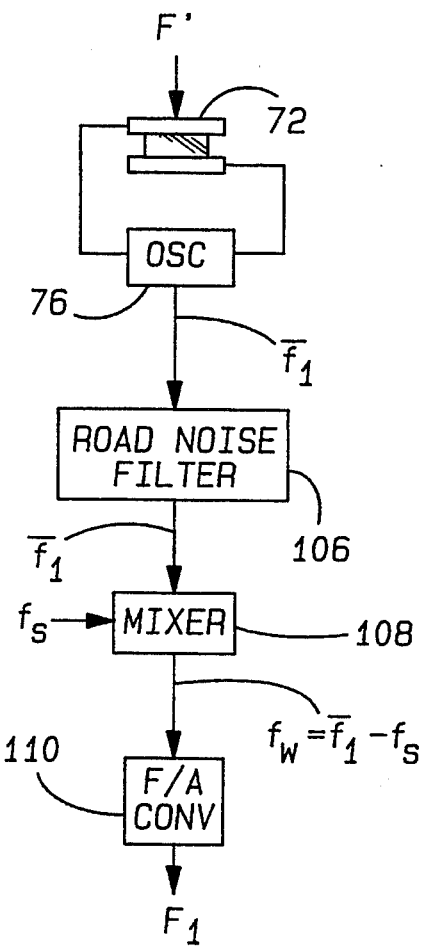
FIG. 9 is a block circuit diagram showing an alternate embodiment of the X and Y axis sensors.

FIG. 9 shows an alternate circuit arrangement for generating the signals $F_1$ and $F_T$. Since the circuits for generating $F_1$ and $F_T$ are substantially identical, only the circuit for generating $F_1$ will be described in detail.

Referring to FIG. 9, the oscillator 76 and piezoelectric crystal 72 generate a frequency $f_1$ in response to the force $F^1$ exerted on crystal 72. A road noise filter 106 frequency filters the frequency $f_1$ to generate a filtered frequency signal $\bar{f}_1$. The filtered frequency signal $\bar{f}_1$ is mixed with a reference frequency $f_S$, in a mixer circuit 108. The frequency $f_S$, corresponds to the force exerted by the leaf spring 68 on piezoelectric crystal 72. A frequency-to-analog converter 110 converts the difference frequency $(\bar{f}_1 - f_S)$ which corresponds to the force $f_w$ exerted only by the force of gravity acting on the weight 66 to an analog signal $F_1$ corresponding to the value of the force exerted by gravity on the weight 66.

It is understood that other types of force sensors, such as strain gages, may be used in place of the piezoelectric crystals 72 and 74 for detecting the forces generated by the weight 66 due to acceleration and gravity. It is further understood that those skilled in the art may conceive alternate embodiments of the grade sensor and its associated electronic circuitry without departing from the invention as set forth in the appended claims.

What is claimed is:

1. A grade and acceleration sensor for measuring the angle of a road grade being traversed by a vehicle and the vehicle's acceleration, said grade and acceleration sensor comprising:
   a weight having a predetermined mass m;
   a first sensor for generating a first signal indicative of a first parameter caused by said weight in response to at least the force of gravity acting on said weight;
   a second sensor for generating a second signal indicative of a second parameter caused by said weight in response to the combined forces of gravity and acceleration of said vehicle acting on said weight;
   grade angle logic means responsive to said first and second signals for generating a grade angle signal having a value corresponding to the grade angle $\theta$ of the grade being traversed by the vehicle; and
   acceleration logic means responsive to said first and second signals for generating an acceleration signal having a value corresponding to the acceleration "a" of the vehicle.

2. The sensor of claim 1 wherein said weight is a bob of a pendulum, pivotally connected to a mounting structure by an arm, and wherein:
   said first sensor is a force sensor measuring the force F exerted by said bob on said arm due to gravity and acceleration of said vehicle to generate said first signal; and
   said second sensor is an angle sensor responsive to the angular displacement of said arm from a predetermined location relative to said mounting structure to generate said second signal having a value corresponding to the angle $\alpha$ of said angular displacement.

3. The sensor of claim 2 wherein said force sensor is a strain gage attached to said arm.

4. The sensor of claim 2 wherein said angle sensor comprises:
   a light source attached to said mounting structure, said light source generating a light beam normal to said angular displacement of said arm;
   a photodetector attached to said mounting structures, said photodetector generating said second signal; and
   a rotary optical encoder attached to said arm and pivotable therewith, said optical encoder extending between said light source and said photodetector, said optical encoder modulating said light beam as a function of angular displacement of said arm, said photodetector generating said second signal in response to the modulation of said light beam to generate said second signal having a value corresponding to the angle $\alpha$, said arm is angularly displaced.

5. The sensor of claim 4 wherein said grade and acceleration sensor has a horizontal axis substantially parallel to the longitudinal axis of said vehicle and a vertical axis normal to said horizontal axis, said angle $\alpha$ is the angle between the arm of said pendulum and said horizontal axis.

6. The sensor of claim 5 wherein said grade logic means comprises first computational means for generating said grade angle $\theta$ in response to said angle $\alpha$ and the value of said force F in accordance with the equation:

$$\theta = 90° - \arcsin(F \sin \alpha / mg)$$

where
- m is the mass of the bob, and
- g is the acceleration due to gravity.

7. The sensor of claim 6 wherein said acceleration logic means comprises second computational means for generating said acceleration in response to said angle $\alpha$ and the value of said force F in accordance with the equation:

$$a = \frac{g\sin(180° - \beta - \alpha)}{\sin\alpha}$$

where $$\beta = \arcsin\left(\frac{F\sin\alpha}{mg}\right)$$

and is the angle between the direction of the force of gravity and said horizontal axis of said sensor;
- g is the acceleration due to gravity; and
- m is the mass of said bob.

8. The sensor of claim 6 wherein said angle $\theta$ generated by said grade logic means has two solutions, said grade logic means further includes:
- means for storing previously generated values of said angle $\theta$ and said acceleration a; and
- first logic means responsive to said previously generated values of said angle $\theta$ and said acceleration a for selecting one of said two possible solutions for said angle $\theta$.

9. The sensor of claim 8 wherein said acceleration "a" generated by said acceleration logic means has two solutions, said acceleration logic means includes:
- means for storing previously generated values of said angle $\theta$ and said acceleration "a"; and
- second logic means responsive to said previously generated values of said angle $\theta$ and said acceleration "a" for selecting one of said two possible solutions for said acceleration "a".

10. The sensor of claim 6 wherein said angle $\theta$ generated by said grade logic means has two different values and wherein said acceleration "a" has two different values, said sensor further comprising:
- acceleration sensor means for generating a first signal indicating the vehicle is accelerating and a second signal indicating the vehicle is decelerating in response to a rotating member of said vehicle, and wherein:
- said grade logic means includes first selection logic for selecting one of said two different values of said angle $\theta$ in response to said first and second signal generated by said acceleration sensor; and
- said acceleration logic means includes second selection logic for selecting one of said two different values of said acceleration "a" in response to said first and second signals generated by said acceleration sensor.

11. The sensor of claim 1 wherein:
- said first sensor is a first force sensor engaged by said weight along a first axis to generate said first signal in response to gravity acting on said weight;
- said second sensor is a second force sensor engaged by said weight along a second axis, normal to said first axis to generate said second signal in response to gravity and acceleration acting on said weight;
- a grade angle generator for generating said grade angle $\theta$ in response to said first signal; and
- acceleration value generator means for generating said value of said acceleration $\alpha$ in response to said second signal and said grade angle $\theta$.

12. The sensor of claim 11 wherein said grade angle generator has computation means for generating said grade angle in accordance with the equation $$\theta = \arccos\left(\frac{F1}{Fo}\right)$$

where $F^1$ is the force generated by said first force sensor when said first axis is disposed at an angle relative to a horizontal position; and
- $F_o$ is the force generated by said first force sensor when said first axis is normal to said horizontal position.

13. The sensor of claim 12 wherein said acceleration value generator means comprises:
- an $F_3$ generator for generating a signal $F_3$ having a value corresponding to the portion of said second signal sensed by said second sensor due to gravity in response to angle $\theta$ generated by said grade angle generator;
- a sum amplifier for subtracting the signal $F_3$ from said second signal to generate a signal $F_2$ having a value corresponding to the force generated by said weight on said second sensor due to acceleration; and
- an acceleration value generator for generating said value of said acceleration $\alpha$ in response to said signal $F_2$.

14. The sensor of claim 13 wherein said acceleration value generator has a computation means for generating said value of said acceleration according to the equation $$a = F_2/m$$

where m is the mass of said weight.

15. The sensor of claim 13 wherein said $F_3$ generator generates said signal $F_3$ in accordance with the equation $$F_3 = mg \sin \theta$$

where m is the mass of said weight, and g is the force of gravity.

16. The sensor of claim 15 further comprising:
- first biasing means for biasing said weight toward said first sensor along said first axis;
- second biasing means for biasing said weight toward said second sensor along said second axis;
- means for subtracting from said first signal a force corresponding to the force generated by said first biasing means; and
- means for subtracting from said second signal a force corresponding to the force generated by said second biasing means.

17. The sensor of claim 13 wherein said acceleration value generator generates two different values for the acceleration $\alpha$, said sensor further comprises accel/decel logic means for selecting one of said two different values of said acceleration in response to previously generated grade angles $\theta$ and the values of the previously generated acceleration.

18. The sensor of claim 13 wherein said grade angle generator may generate a grade angle $\theta$ having two different values, $\theta$ and $180°-\theta$, and said acceleration value generator may generate two different acceleration values, $+a$ and $-a$, said sensor further comprising:

an acceleration direction sensor generating a first signal in response to detecting when the vehicle is accelerating and a second signal in response to when the vehicle is decelerating;

grade angle logic means responsive to said grade angles generated by said grade angle generator, said first signal and said second signal to select one of said two different values; and acceleration/deceleration logic responsive to the values of said acceleration values generated by said acceleration value generator, said first and said second signals to select one of said two different acceleration values.

19. The sensor of claim 11 wherein said first and second force sensors each comprise:

a piezoelectric crystal engaged by said weight, said piezoelectric crystal having electrical properties variable as a function of the force exerted by said weight;

an oscillator circuit controlled by said piezoelectric crystal, the frequency of said oscillator variable as a function of the forces exerted by said weight on said piezoelectric crystal; and frequency-to-analog converter means for converting said frequency generated by said oscillator circuit to an analog signal having a value corresponding to the force applied by said weight to said piezoelectric crystal.

20. The sensor of claim 11 wherein said grade angle generator generates two different values for the grade angle $\theta$, said sensor further comprising grade angle logic means for selecting one of said two different grade angles in response to previously generated grade angles $\theta$ and values of said acceleration $a$.

21. A method for generating a grade angle $\theta$ and an acceleration value a for a vehicle, comprising the steps of:

detecting a first parameter produced by a weight in response to at least the force of gravity acting on said weight to generate a first signal;

detecting a second parameter produced by a weight in response to the combined forces of gravity and acceleration acting on said weight to generate a second signal;

generating a grade angle signal $\theta$ corresponding to the angle of a grade being traversed by said vehicle in response to said first and second signal; and generating an acceleration signal "a" corresponding to the acceleration of said vehicle in response to said first and second signals.

22. The method of claim 21 wherein said weight is the bob of a pendulum pivotally connected to a support structure by an arm, said step of detecting a first parameter comprises the step of detecting an angular displacement $\alpha$ of said arm from a predetermined position, and said step of measuring the force F on said arm due to gravity and the acceleration of said pendulum.

23. The method of claim 22 wherein said step of generating a grade angle $\theta$ comprises the step of solving the equation:

$$\theta = 90° - \arcsin(F \sin \alpha / mg)$$

wherein
m is the mass of said bob, and
g is the force of gravity,
and wherein said step of generating an acceleration signal $\alpha$ comprises the step of solving the equation:

$$a = g\sin\frac{(180° - \beta - \alpha)}{\sin\alpha}$$

where $$\beta = \arcsin\left(\frac{F\sin\alpha}{mg}\right)$$

24. The method of claim 21 wherein said step of detecting a first parameter comprises the step of detecting the force $F'$ exerted by said weight due to gravity along a first axis and said step of detecting a second parameter comprises the step of detecting the force $F''$ exerted by said weight due to gravity and acceleration along a second axis normal to said first axis.

25. The method of claim 24 wherein said step of generating a grade angle $\theta$ comprises the step of solving the equation $$\theta = \arccos\left(\frac{F'}{F_o}\right) \qquad (3)$$

where $F_o$ is the value of $F'$ when said first force is parallel to the force of gravity;

and wherein said step of generating said value of said acceleration comprises solving the equation:

$$a = F_2/m \qquad (4)$$

where
$F_2 = F'' - mg\sin\theta$ and
m is the mass of the weight, and
$\theta$ is the angle of the grade.

* * * * *